US007567960B2

(12) United States Patent
Wei et al.

(10) Patent No.: US 7,567,960 B2
(45) Date of Patent: Jul. 28, 2009

(54) SYSTEM AND METHOD FOR CLUSTERING, CATEGORIZING AND SELECTING DOCUMENTS

(75) Inventors: Li Wei, Riverside, CA (US); John C. Handley, Fairport, NY (US); Nathaniel G. Martin, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 171 days.

(21) Appl. No.: 11/343,499

(22) Filed: Jan. 31, 2006

(65) Prior Publication Data

US 2007/0192308 A1    Aug. 16, 2007

(51) Int. Cl.
*G06F 17/30* (2006.01)
(52) U.S. Cl. .................. 707/5; 707/2; 707/10; 382/233; 382/239; 341/76; 341/155
(58) Field of Classification Search ........................ None
See application file for complete search history.

(56) References Cited

U.S. PATENT DOCUMENTS

| | | | |
|---|---|---|---|
| 6,347,313 B1 * | 2/2002 | Ma et al. ........................ 707/3 |
| 6,349,313 B1 * | 2/2002 | Momoh et al. .............. 707/205 |
| 6,487,541 B1 * | 11/2002 | Aggarwal et al. ............. 705/26 |
| 6,567,797 B1 * | 5/2003 | Schuetze et al. ............... 707/2 |
| 7,158,986 B1 * | 1/2007 | Oliver et al. ................ 707/102 |
| 2002/0156760 A1 * | 10/2002 | Lawrence et al. ............... 707/1 |
| 2003/0167443 A1 * | 9/2003 | Meunier et al. ............. 715/511 |

OTHER PUBLICATIONS

U.S. Appl. No. 11/111,387, filed Apr. 21, 2005, Xue Gu et al.
Potharst, R. et al., "Classification Trees for Problems with Monotonicity Constraints", SIGKDD Explorations, vol. 4, Issue 1, 10 pp.
Potharst, R. et al., "Monotone Decision Trees", Department of Computer Science, Erasmus University Rotterdam, 39 pp.
Ben-David, Arie, "Monotonicity Maintenance in Information-Theoretic Machine Learning Algorithms", Machine Learning, vol. 19, pp. 29-43.
Sill, Joseph et al., "Monotonicity Hints", 7 pp.
Feelders, A.J., "Prior Knowledge in Economic Applications of Data Mining", 11 pp.
Eamonn Keogh et al., "Towards Parameter-Free Data Mining", Department of Computer Science and Engineering, University of California, Riverside, 12 pp.

* cited by examiner

*Primary Examiner*—Don Wong
*Assistant Examiner*—Andalib F Lodhi
(74) *Attorney, Agent, or Firm*—Pepper Hamilton LLP

(57) ABSTRACT

A method and system of providing a recommendation measures a distance between a first document and group of clustered historic documents using a compression-based dissimilarity measurement (CDM). The CDM identifies the closest clustered historic documents and identifies a recommendation corresponding to the closest cluster.

12 Claims, 2 Drawing Sheets

SYSTEM AND METHOD FOR CLUSTERING, CATEGORIZING AND SELECTING DOCUMENTS

BACKGROUND

1. Technical Field

This disclosure contained herein relates to systems and methods for identifying products, systems, solutions, or other material to a user based on historic data such as question-and-answer data.

2. Description of the Related Art

Question-and-answer structures exist in a wide variety of fields. For example, consumers are often asked questions in order to determine their inclination to purchase various products and services. Scientists, engineers, medical professionals and others may use a computing device to enter data or answer questions in order to research possible solutions to a problem relating to their technical field. Technical service personnel, such as individuals who service copying or printing equipment, also may enter data or answer questions in order to locate relevant service logs prepared by technicians who have encountered similar technical issues.

The disclosure contained herein describes attempts to provide improved methods and systems for identifying products, systems, solutions, or other material to a user based on historic data such as question-and-answer data.

SUMMARY

In an embodiment, a method of providing a recommendation includes processing a first document in order to remove at least some structural data such as XML tags. The document may contain information such as questions and answers from a questionnaire. The method may then include measuring a distance between the first document and each of a plurality of other documents using a compression-based dissimilarity measurement (CDM), and identifying a recommendation based on the result of the measuring. The CDM may be measured as a size of a compressed concatenation of the first document and a second document over a sum of the sizes of the first document and the second document.

The method may also include identifying a document within the plurality of other documents having the closest distance to the first document, such that the recommendation is related to the identified document. The first document and a second document may be closer (i.e., more similar or closely related) if the CDM is lower, while the documents may be more different (i.e., less closely related) if the CDM is higher. The method may also include assigning a category or cluster to the first document based on the distance measured between the documents. In such an embodiment, the recommendation may be related to the assigned category or cluster. The clustered documents may be maintained in a database, and the method may also include adding the first document to the database and clustering the document in the assigned category.

In another embodiment, a method includes measuring a distance between a first document and each of a plurality of other documents using a compression-based dissimilarity measurement. The documents may be clustered into a plurality of clusters using a hierarchical clustering method so that documents having distances that are close to each other are clustered with each other. The method also may include identifying a recommendation for each of the clusters. The method may also include receiving a new document, as well as measuring a distance between the new document and the clustered documents using the compression-based dissimilarity measurement to identify the document within the clustered documents to which the new document is closest. The recommendation may be for the cluster corresponding to the closest document. Optionally, the method may also include adding the new document to the cluster of the closest document.

In another embodiment, a recommendation system includes a processor-readable medium containing program instructions that instruct an electronic device to receive a first document, access a database containing a plurality of historic documents that each correspond to a category, measure a distance between the first document and a group of the historic documents using a compression-based dissimilarity measurement, identify the historic document having the closest distance to the first document, and select a recommendation that relates to the category that corresponds to the identified historic document. Before the measuring, the instructions also may cause the computing device to process the first document to remove at least a portion of structural data from the first document. The instructions also may cause the computing device to add the first document to the database. When the first document is added to the database, the instructions may also cause the computing device to cluster the first document in the category that corresponds to the identified historic document.

DETAILED DESCRIPTION

Figure 1:
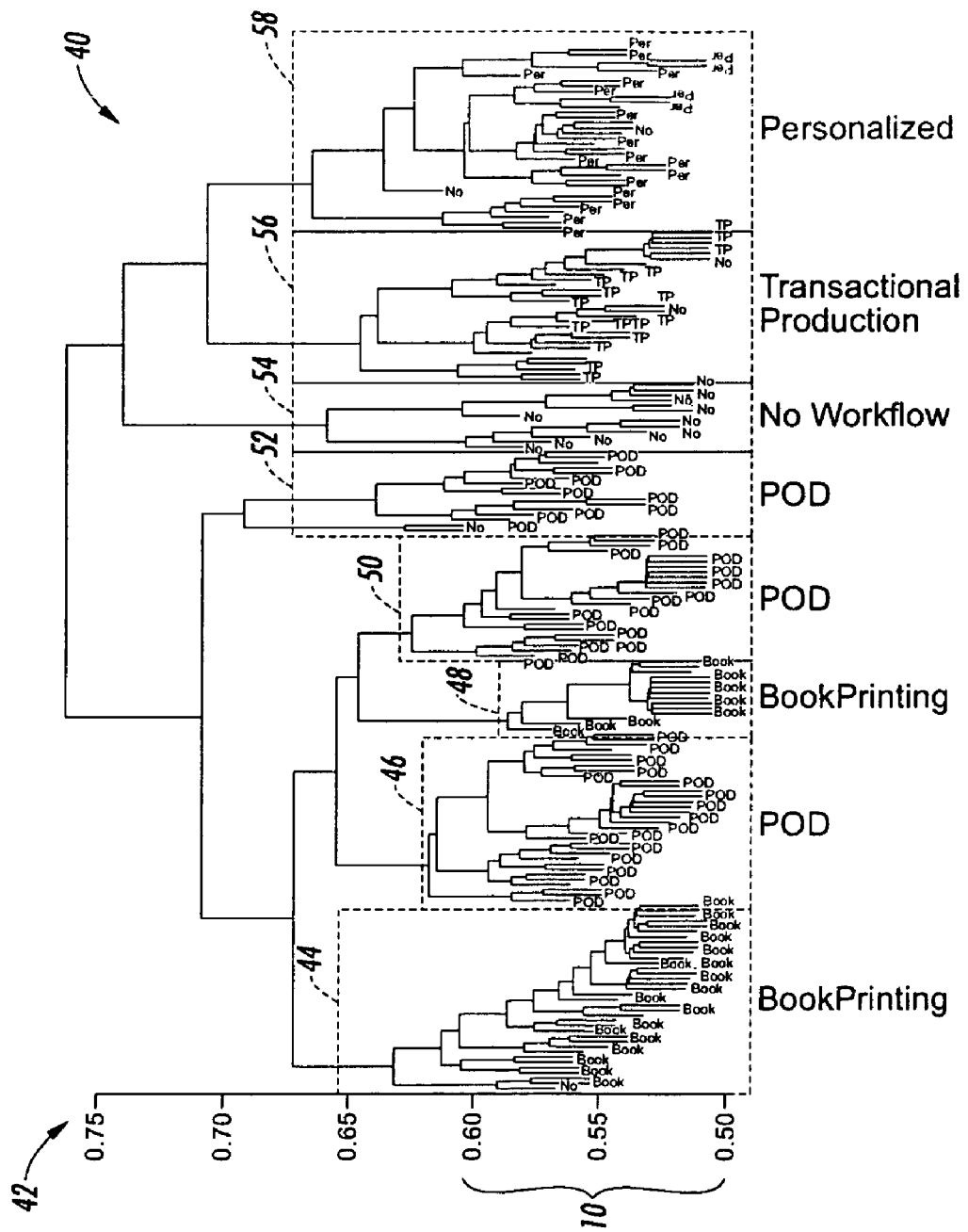
FIG. 1 is a dendrogram illustrating an exemplary group of clustered documents.

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Thus, for example, reference to a "document" is a reference to one or more text strings, electronic files or documents and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the embodiments described herein are not entitled to antedate such disclosure by virtue of prior invention.

In an embodiment, a method and system recommends products, systems, solutions or other items to one or more users based on one or more prior documents. The prior documents, which may be maintained in a database or other memory in electronic form, may contain data such as historic question-and-answer data. In an embodiment, the system may serve as a configuration tool that recommends a system configuration, such as a configuration of printing shop equipment, process manufacturing equipment, or another collection of items and processes, based on questions and answers. In another embodiment, by using a customer's responses and the questions they viewed, the configuration tool simplifies the information using historical data to classify the incoming requirements to the correct configuration and validate the rule-based system.

The description that follows generally relates a system which uses historical data to classify incoming data into separate clusters. In one embodiment, the system is a web-based tool which provides an interactive questionnaire survey process to dynamically capture user workflow requirements of constraints of customers. A "questionnaire" or "question-and-answer" document may include documents that elicit responses, such as direct questions, true/false statements, multiple choice selections and others.

For example, the following processing code segment illustrates a question-and-answer document file that may be stored, clustered and processed by the system:

```
...<?xml version="1.0" encoding="UTF-8" standalone="no" ?>
  <GUIJspbean>
  <GUIQuestionnaireQuestionnaireVector>
  <GUIQuestionnaireLocalizableMessage>Printing Application Types
  (select all that apply)
  </GUIQuestionnaireLocalizableMessage>
  <GUIQuestionnaireSelectMultipleChoice isSelected="false">
  <GUIQuestionnaireLocalizableMessage>General Commercial /
  Annual Reports
  </GUIQuestionnaireLocalizableMessage>
  </GUIQuestionnaireSelectMultipleChoice>
  <GUIQuestionnaireSelectMultipleChoice isSelected="false">
  <GUIQuestionnaireLocalizableMessage>Books</
  GUIQuestionnaireLocalizableMessage>
  </GUIQuestionnaireSelectMultipleChoice>
```

In the code segment listed above, various XML tags are used to provide document structure. Questions and answers are listed in bold text. A first question prompts a user to select a printing application type or types. The user selected "no" (or "false") to both "General Commercial/Annual Reports" and "Books." As illustrated by this code segment, a group of question-and-answer documents can be very similar in nature. Because certain text features, such as the word "false" or the worse that appear in introduction questions, individual documents may initially appear to be very similar in nature. Accordingly, we have found that it is desirable to provide methods of clustering question-and-answer documents and generating recommendations in a manner that is useful in view of the potential that many of the clustered documents may be similar in nature.

Referring to FIG. 1, a group of documents 10 may be analyzed and clustered by category. One such document may be an interactive questionnaire. The questionnaire may follow a tree structure in which the decision about what question to present to a user is based on the user's answer to one or more previous questions. For example, a questionnaire used for identifying a print shop customer's requirements may start by asking what print equipment the customer uses. Depending on the equipment used, the questionnaire may then present questions that are specific to the customer's equipment. Question responses may include yes/no or multiple choice responses, free text, multiple and single (e.g., radio button) selections, and/or other responses. Similar questionnaires can be provided for numerous situations, such as medical diagnosis questionnaires, equipment service logs, and other situations.

Figure 2:
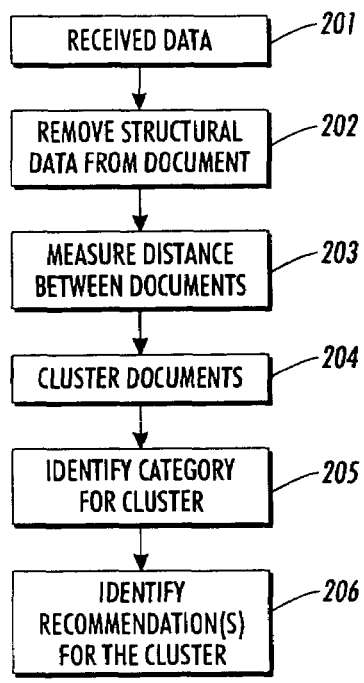
FIG. 2 is a flowchart illustrating exemplary steps that may be used to develop the dendrogram of FIG. 1.

Documents in the database may be clustered by comparing them to each other and grouping documents that are similar in nature. FIG. 2 illustrates a method of measuring similarity between documents using a compression-based dissimilarity measurement (CDM). Referring to FIG. 2, an incoming data stream, if not already contained in a document, may be collected and placed into an electronic document (step 201). In one embodiment, the data may be from a customer who completed a dynamic questionnaire. The questionnaire questions and answers may be placed into a document. In another embodiment, the document contains data from a customer. This document or log may include text, matrices, XML formatting, or a document in a database.

The document may contain pure data, or it may contain formatting and description codes such as XML tags. Formatting and description codes do not necessarily reflect the nature of the document's subject matter. In fact, codes such as XML tags can be misleading for clustering purposes because two documents may have identical tags. Because there may be many the tags, and because the tags may be long, the tags may occupy a large portion of the document. Thus, an analysis of all features of each document may suggest that the documents are similar even though they contain entirely different subject matter. In such a case, to help similarity measures focus on subject matter similarity instead of structural similarity, the document may processed 202 to remove XML tags or other structural data. For example, if the log is in XML format and contains XML tags, the tags may be stripped off. Once the XML tags are removed, the new case log may contain only or substantially only the questions and answers. However, the removal of structural data is optional, and not all embodiments include or require this step.

After the document is stripped of formatting and other unneeded data and is in an acceptable form, the document may be compared with other documents that have been similarly stripped in order to measure a distance between two documents 203. In one embodiment, the distance may be measured using a CDM value. The CDM may be used to determine the approximate distance between two documents represented as strings of data x and y. Given two strings x and y, the CDM may be measured as $$CDM(x, y) = \frac{C(xy)}{C(x) + C(y)}$$

The CDM is close to one when x and y are not at all related. Numbers less than one represent documents that are similar, and it is smaller than one if x and y are related. The lower the CDM, the more similar the documents. Note that CDM (x, x) is not zero. The smaller the CDM number, the more related the data strings (and, therefore, the more similar the documents).

The measurement of dissimilarity by CDM may be implemented in various ways. For example, a CDM algorithm may compressed a first document file A and a second document file B, concatenate the first and second document files A and B, compress the concatenated result, and divide the concatenated result by the sum of the sizes of the first compressed document file A and the second compressed document file B.

When CDM values have been developed for multiple documents, any suitable clustering method may be used to group similar documents into clusters 204. For example, referring to FIG. 3, any suitable hierarchical agglomerative clustering method may be used to develop a dendrogram 40 such that similar documents (i.e., pairs of documents having a low CDM 42), appear lower in the dendrogram, while documents having a higher CDM appear higher in the dendrogram. Clusters are formed by the union of two clusters at the next level down in the dendrogram.

Distance between clusters may be measured using any suitable measurement method, such as single linkage measurement, complete linkage measurement, or comparison of centroids (i.e., measuring a distance between the average elements of each cluster). A single link metric measures the similarity of two clusters based on the distance between their closest (i.e., most similar) points. This metric often forms long straggle clusters. $d(C1,C2)=\min\{d(x,y)|x \in C1, y \in C2\}$. A complete link metric measures the similarity of two clusters based on the similarity of their most distant (i.e., least similar) points. This metric tends to form compact clusters. $d(C1,C2)=\max\{d(x,y)|x \in C1, y \in C2\}$. Lastly, the average link metric measures the similarity of two clusters based on the average similarity of the points contained in them. $d(C1,C2)=\text{avg}\{d(x,y)|x \in C1, y \in C2\}$. The type of linkage metric used may affect the hierarchical algorithms since it reflects the particular concept of closeness and connectivity. Each linkage metric may be run to determine which forms the best results. Documents may be considered close if the distance between the documents is closer than the distance between each of the documents and any other document. Relative "closeness" may depend on the nature of the documents themselves. Although FIG. 2 shows documents that are clustered and which have CDMs of approximately 0.5 to 0.6, other CDM values may be used to group a cluster depending on the available data set.

After a group of documents are clustered as shown in FIG. 1, the clusters 44, 46, 48, 50, 52, 54, 56 and 58 may become apparent. The documents in each cluster may then be analyzed to identify a category to which each cluster belongs (see step 205 in FIG. 2). Cluster analysis and categorization may be done manually or by automated text analysis to identify common subject matter items in each cluster. For example, FIG. 1 shows clusters of documents relating to print shops may be categorized as relating to Print On-Demand (POD) services 46, 50 and 52, Book Printing 44 and 48, "No Workflow" situations 54, Transactional 56, and Personalization 58. In another embodiment, the clustered document categories can refer to other activities that relate to a different service being performed. For example, if the data relates to medical information, the clusters could be symptoms that describe flu symptoms, ear infection, or step throat.

When a group of documents are clustered and categorized, one or more recommendations may be developed for a cluster (step 206 in FIG. 2). For example, the recommendation for a "Book Printing" customer may include a service bulleting that includes common maintenance activities for book printing equipment. The recommendation may include actual documents that are contained in the cluster, or it may include one or more documents that are separate from the clustered document set.

Figure 3:
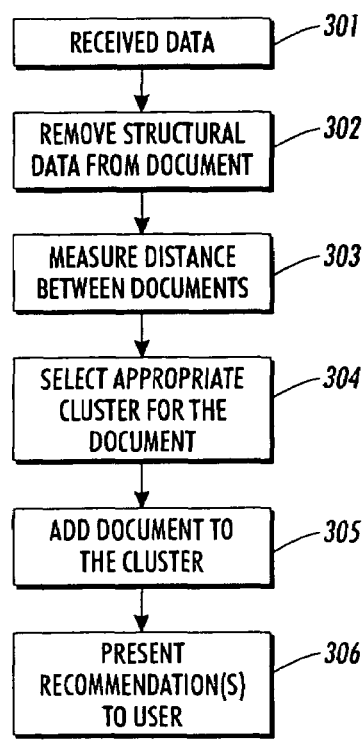
FIG. 3 is a flowchart illustrating exemplary steps that may be used to present recommendations to a user.

When a set of clustered documents and recommendations are available in one or more databases, new data, such as questions and answers from a questionnaire, may be received by a recommendation system. Referring to FIG. 3, the new document may be received as a text stream, in which case data from the stream will be placed into a new log file or other storage mechanism (step 301). Alternatively, the data may already be received as a log or other file. The data may be processed (step 302) to strip formatting instructions, structural tags, developers' notes and other unneeded items. The document may then be compared to the documents in the database using CDM (step 303) to determine which document its (or documents are) most similar, and thus to select the appropriate cluster for the document (step 304). Optionally, the document may be added to the cluster (step 305) to provide additional data for future analyses. Based on the cluster that applies to the document, the system may present a recommendation to a user (step 306). As noted above, the recommendation may include actual documents that are contained in the cluster, or it may include one or more documents or other items that are separate from the clustered document set but which have been previously selected as appropriate recommendations for the cluster. The recommendation may be to tied to specific documents in that cluster or the recommendation so that the recommendation presented is that for the particular document to which the new log is closest. Alternatively, the recommendation may be a generic response for all documents that fall within that cluster. In yet another alternative, both types of recommendations may be presented.

The methods described herein may be implemented via any device having electronic processing capability such as a personal computer, personal digital assistant, or other item or collection of items. Program instructions may be stored on a processor-readable medium or carrier such as a floppy disk, hard drive, flash memory, digital disk or other recording medium, a communications signal or a carrier wave, in order to instruct the device or devices to implement the methods.

A multiprocessor system may optionally be used to perform one, some or all of the operations described herein. Likewise, an embedded system may optionally be used to perform one, some or all of the operations described herein It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of providing a recommendation comprising:
  measuring a distance by a processor between a first document and each second document in a plurality of other documents by:
    compressing the first document to determine a first size,
      compressing a second document to determine a second size,
    compressing a concatenation of the first document and the second document to determine a third size, and
    determining a compression-based dissimilarity measurement based on a ratio between the third size and a sum of the first size and the second size, wherein the first document and a second document are more closely related if the compression-based dissimilarity measurement is lower, the first document and a second document are less closely related if the compression-based dissimilarity measure is higher, and the compression based dissimilarity measurement has a value that is not greater than one;
  organizing a cluster comprising the first document and one or more of the other documents based on the measured distances between the first document and the other documents by the processor;
  categorizing the cluster based on a common subject matter between the clustered documents by the processor; and selecting one or more documents based on the category of the cluster.

2. The method of claim 1 further comprising processing the first document before the measuring in order to remove at least some structural data from the first document.

3. The method of claim 2 wherein the processing comprises removing XML tags.

4. The method of claim 1, wherein the first document and the other documents comprise electronic files containing data representative of questions and answers.

5. The method of claim 1 wherein the compression based dissimilarity measure identifies a cluster in which the first document fits.

6. A method comprising:
measuring a distance by a processor between a first document and each second document in a plurality of other documents by:
compressing the first document to determine a first size,
compressing a second document to determine a second size,
compressing a concatenation of the first document and the second document to determine a third size, and
determining a compression-based dissimilarity measurement based on a ratio between the third size and a sum of the first size and the second size, wherein the first document and a second document are more closely related if the compression based dissimilarity measurement is lower, the first document and a second document are less closely related if the compression based dissimilarity measure is higher, and the compression based dissimilarity measurement has a value that is not greater than one;
clustering the documents into a plurality of clusters using a hierarchical clustering method based so that documents having distances that are close to each other are clustered with each other by the processor;
categorizing the cluster documents based on a common subject matter between the clustered documents by the processor; and
selecting one or more documents based on the category of the cluster.

7. The method of claim 6, further comprising:
receiving a new document; and
measuring a distance between the new document and the clustered documents using the compression-based dissimilarity measurement to identify the document within the clustered documents to which the new document is closest.

8. The method of claim 7 further comprising adding the new document to the cluster of the closest document.

9. The method of claim 7, wherein the new document and the clustered document comprise question-and-answer documents.

10. A recommendation system, comprising:
a memory containing program instructions that instruct an electronic device to:
receive a first document, wherein the instructions cause the computing device to add the first document to a database;
access the database containing a plurality of historic documents, wherein each of the historic documents corresponds to a category;
measure a distance between the first document and each second document in a plurality of the historic documents by:
compressing the first document to determine a first size,
compressing a second document to determine a second size,
compressing a concatenation of the first document and the second document to determine a third size, and
determining a compression-based dissimilarity measurement based on a ratio between the third size and a sum of the first size and the second size wherein the first document and a second document are more closely related if the compression based dissimilarity measurement is lower, the first document and a second document are less closely related if the compression based dissimilarity measure is higher, and the compression based dissimilarity measurement has a value that is not greater than one;
organize a cluster comprising the first document and one or more of the other historic documents based on the measured distances between the first document and the other documents;
categorize the cluster based on a common subject matter between the clustered documents; and
select one or more documents based on the category of the cluster.

11. The system of claim 10, wherein the instructions also include instructions to cause the computing device to process the first document to remove at least a portion of structural data from the first document before the measuring.

12. The system of claim 10, wherein the first documents and the historic documents comprise question-and-answer documents.

* * * * *